US010528832B2

United States Patent
Mudalige et al.

(10) Patent No.: US 10,528,832 B2
(45) Date of Patent: Jan. 7, 2020

(54) METHODS AND SYSTEMS FOR PROCESSING DRIVER ATTENTION DATA

(71) Applicant: GM GLOBAL TECHNOLOGY OPERATIONS LLC, Detroit, MI (US)

(72) Inventors: Upali P. Mudalige, Oakland Township, MI (US); Donald K. Grimm, Utica, MI (US); Wende Zhang, Birmingham, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 106 days.

(21) Appl. No.: 15/954,855

(22) Filed: Apr. 17, 2018

(65) Prior Publication Data
US 2019/0318180 A1 Oct. 17, 2019

(51) Int. Cl.
*G06K 9/00* (2006.01)
*G06F 3/01* (2006.01)

(52) U.S. Cl.
CPC ......... *G06K 9/00845* (2013.01); *G06F 3/013* (2013.01); *G06K 9/00805* (2013.01); *G06T 2207/30201* (2013.01); *G06T 2207/30261* (2013.01)

(58) Field of Classification Search
CPC ............ G06K 9/00845; G06K 9/00805; G06F 3/013; G06T 2207/30261; G06T 2207/30201
USPC ......................................................... 382/104
See application file for complete search history.

(56) References Cited

U.S. PATENT DOCUMENTS

| 2018/0046851 A1* | 2/2018 | Kienzle ................... G06F 3/017 |
| 2018/0075309 A1* | 3/2018 | Sathyanarayana ... G05D 1/0088 |
| 2018/0082203 A1* | 3/2018 | Bender .................. G01C 21/20 |

* cited by examiner

*Primary Examiner* — Amandeep Saini
(74) *Attorney, Agent, or Firm* — Lorenz & Kopf, LLP

(57) ABSTRACT

Methods and systems are provided for processing attention data. In one embodiment, a method includes: receiving, by a processor, object data associated with at least one object of an exterior environment of the vehicle; receiving upcoming behavior data determined from a planned route of the vehicle; receiving gaze data sensed from an occupant of the vehicle; processing, by the processor, the object data, the upcoming behavior data, and the gaze data to determine an attention score associated with an attention of the occupant of the vehicle; and selectively generating, by the processor, signals to at least one of notify the occupant and control the vehicle based on the attention score.

17 Claims, 5 Drawing Sheets

METHODS AND SYSTEMS FOR PROCESSING DRIVER ATTENTION DATA

INTRODUCTION

The technical field generally relates to methods and systems for processing attention data associated with a driver of a vehicle, and more particularly to methods and systems for processing attention data using vehicle perception data and behavior plan data.

Gaze detection systems generally include one or more cameras that are pointed at the eyes of an individual and that track the eye position and gaze direction of the individual. Vehicle systems use gaze detection systems to detect the gaze direction of a driver. The gaze direction of the driver is then used to detect the driver's attentiveness to the road ahead of them, or the driver's general attention to a feature inside the vehicle.

For example, some vehicle systems use the gaze direction of a driver to determine if the driver is inattentive to the road and to generate warning signals to the driver. In another example, some vehicle systems determine that the driver is looking in the direction of a particular control knob or switch of the vehicle and can control that particular element (e.g., turn it on, etc.) based on the determination. In each of the examples, the vehicle systems make a general determination of where the driver is looking and do not make a determination of what the driver is looking at (i.e. what is grasping the attention of the driver). In certain driving conditions, such as urban driving conditions, the driver attention will be based on the current driving conditions. For example, if the vehicle is stopped at stop sign, the driver may look left and then right. In another example, if the vehicle is about to make a turn, the driver attention will be in the direction of the upcoming turn.

Accordingly, it is desirable to provide improved methods and systems for detecting the attention of a driver based on the driving conditions. In addition, it is desirable to provide methods and system for making use of the information determined from the detected attention of the driver to the particular point or object. Furthermore, other desirable features and characteristics of the present invention will become apparent from the subsequent detailed description and the appended claims, taken in conjunction with the accompanying drawings and the foregoing technical field and background.

SUMMARY

Methods and systems are provided for processing attention data. In one embodiment, a method includes: receiving, by a processor, object data associated with at least one object of an exterior environment of the vehicle; receiving upcoming behavior data determined from a planned route of the vehicle; receiving gaze data sensed from an occupant of the vehicle; processing, by the processor, the object data, the upcoming behavior data, and the gaze data to determine an attention score associated with an attention of an occupant of the vehicle; and selectively generating, by the processor, signals to at least one of notify the occupant and control the vehicle based on the attention score.

In various embodiments, the processing includes computing an object location from the object data, computing a gaze location from the gaze data, computing an upcoming behavior location from the upcoming behavior data, and computing the attention score based on the gaze location, the object location, and the upcoming behavior location.

In various embodiments, computing the attention score includes computing a matching level between the object location and the gaze location. In various embodiments, computing the attention score further includes applying a weighting factor to the matching level. In various embodiments, computing the matching level is based on a duration of matching. In various embodiments, computing the matching level is based on a breadth of matching. In various embodiments, the weighting factor is dynamically determined based on environmental conditions.

In various embodiments, the weighting factor is dynamically determined based on a driving scenario. In various embodiments, computing the attention score includes computing a matching level between the upcoming behavior location and the gaze location. In various embodiments, computing the attention score further includes applying a weighting factor to the matching level.

In various embodiments, computing the matching level is based on a duration of matching. In various embodiments, computing the matching level is based on a breadth of matching.

In various embodiments, the method further includes determining a distraction level based on a matching between the gaze location and a distraction region, and wherein the attention score is further determined based on the distraction level.

In various embodiments, the method further includes applying a weighting factor to the distraction level and wherein the attention score is further based on the weighted distraction level. In various embodiments, the weighting factor is dynamically determined based on environmental conditions. In various embodiments, the weighting factor is dynamically determined based on a driving scenario.

In various embodiments, the method further includes receiving gaze data from occupants of other vehicles at a same location; determining a general gaze direction based on the gaze data from the occupants of other vehicles. The processing the object data, the upcoming behavior data, and the gaze data to determine the attention score further includes processing the object data, the upcoming behavior data, the gaze data from the occupant, and the general gaze direction to determine the attention score associated with an attention of the occupant of the vehicle.

In another embodiment, a system for processing attention data includes: a first non-transitory module that processes, by a processor, object data associated with at least one object of an exterior environment of the vehicle to determine an object location; a second non-transitory module that processes, by a processor, upcoming behavior data determined from a planned route of the vehicle to determine an upcoming behavior location; a third non-transitory module that processes, by a processor, gaze data sensed from an occupant of the vehicle to determine a gaze location; a fourth non-transitory module that processes, by a processor, the object location, the upcoming behavior location, and the gaze location to determine an attention score associated with an attention of an occupant of the vehicle; and a fifth non-transitory module that, by a processor, selectively generates signals to at least one of notify the occupant and control the vehicle based on the attention score.

In various embodiments, the fourth non-transitory module computes the attention score based on a matching level between the object location and the gaze location and a matching level between the upcoming behavior location and the gaze location. In various embodiments, the fourth non-transitory module computes the attention score based on a weighting factor applied to the matching level between the object location and the gaze location and a weighting factor applied to the matching level between the upcoming behavior location and the gaze location.

BRIEF DESCRIPTION OF THE DRAWINGS

The exemplary embodiments will hereinafter be described in conjunction with the following drawing figures, wherein like numerals denote like elements, and wherein.

DETAILED DESCRIPTION

Figure 1:
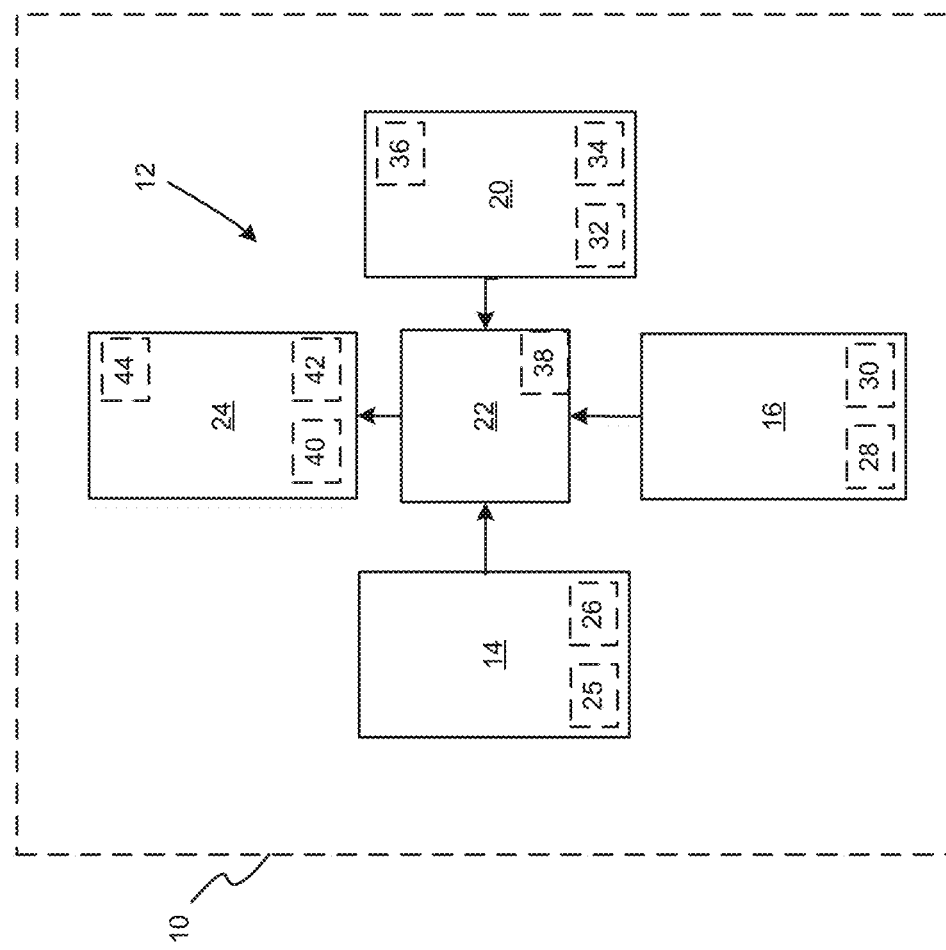
FIG. 1 is a functional block diagram of a vehicle that includes a driver attention detection system of a vehicle in accordance with various embodiments.

The following detailed description is merely exemplary in nature and is not intended to limit the application and uses. Furthermore, there is no intention to be bound by any expressed or implied theory presented in the preceding technical field, background, brief summary or the following detailed description. It should be understood that throughout the drawings, corresponding reference numerals indicate like or corresponding parts and features. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Although the figures shown herein depict an example with certain arrangements of elements, additional intervening elements, devices, features, or components may be present in actual embodiments.

With reference now to FIG. 1, a functional block diagram illustrates portions of a vehicle 10 that include a driver attention detection system 12 in accordance with various embodiments. As can be appreciated, the vehicle 10 may be any vehicle type, including but not limited to an automobile, an aircraft, a spacecraft, a watercraft, a sport utility vehicle, or any other type of vehicle 10. In various embodiments, the vehicle 10 is, for example, an autonomous vehicle that is automatically controlled by an electronic control system in some manner. In an exemplary embodiment, the vehicle 10 is a so-called Level Three or Level Two automation system which includes less than full automation and includes partial driver involvement. For exemplary purposes, the disclosure will be discussed in the context of detecting the attention of the driver. As can be appreciated, the attention detection system 12 can be implemented for other occupants of the vehicle 10 and is not limited to the driver.

In various embodiments, the driver attention detection system 12 includes a driver monitoring system 14, a perception system 16, a behavior planning system 20, an attention determination system 22, and a vehicle/notification system 24. As can be appreciated, the driver monitoring system 14, the perception system 16, the behavior planning system 20, the attention determination system 22, and the vehicle/notification system 24 can be implemented as separate systems (as shown), as a single system, or as a combination of any of the systems, in various embodiments.

The driver monitoring system 14 determines information about the direction in which the driver is gazing. For example, the driver monitoring system 14 includes one more sensor devices 25 that sense activity of the driver and generate sensor signals based thereon; and a data processing module 26 that receives and processes the sensor signals in order to determine gaze data indicating the gaze direction. In various embodiments, the sensor devices 25 include one or more cameras disposed within the vehicle 10 and directed towards the head, face, and/or upper body of the driver. The cameras capture images of the driver and generate image data based thereon. The data processing module 26 receives the image data, processes the image data using one or more image processing techniques, and determines a gaze and/or head direction of the driver.

The perception system 16 determines activity of objects in the environment of the vehicle 10. In various embodiments, the perception system 16 includes one more sensor devices 28 that sense activity of the environment surrounding the vehicle 10 and generate sensor signals based thereon; and a data processing module 30 that receives and processes the sensor signals in order to determine the activity of the objects in the environment. In various embodiments, the sensor devices 28 include one or more cameras, lidars, radars, and/or other sensing devices are disposed about the exterior of the vehicle 10 and are directed towards the environment surrounding the vehicle 10. The sensor devices 28 capture information about the environment and generate sensor data based thereon. The data processing module 30 receives the sensor data and processes the sensor data using one or more machine learning techniques to determine objects and their trajectories in the environment.

The behavior planning system 20 determines upcoming behavior of the vehicle 10. The upcoming behavior can be, for example, but is not limited to, a lane change, a lane merge, a right turn, a left turn, a curve, etc. In various embodiments, the behavior planning system 20 includes one or more sensor devices 32, a map datastore 34, and a data processing module 36. The map datastore 34 stores maps of the environment. The sensor devices 32 include a global positioning satellite device, cameras, lidars, radars, or any other device that provides location information of the vehicle 10 relative to the environment. The sensor devices 32 generate sensor signals. The data processing module 36 receives the signals and determines the upcoming behavior based on a planned route (e.g., a route or a route segment between location A and location B that is associated with the defined map), and the current location along the planned route. As can be appreciated, the behavior planning system 20 can determine the current location, the planned route, and upcoming behavior based on various methods and is not limited to any one embodiment.

The attention determination system 22 receives data from the driver monitoring system 14, the perception system 16, and the behavior planning system 20 indicating the determined gaze direction, the tracked activity of objects in the environment, and the upcoming behavior respectively. The attention determination system 22 includes a data processing module 38 that determines the attention of the driver based on the received data. For example, as will be discussed in more detail with regard to FIGS. 2-5, the attention determination system 22 determines the attention based on a comparison of the gaze direction with the tracked activity of the objects and a comparison of the gaze direction and the upcoming behavior. The attention determination system 22 selectively generates one or more signals based on the determined attention of the driver.

In various embodiments, the attention determination system 22 further receives data from driver monitoring systems 14 of other vehicles (not shown) or a central processing system (not shown), for example, via a communication system. In such embodiments, the data from the vehicles is generally indicates the gaze of other drivers when at the same location as the vehicle. In such embodiments, the attention determination system 22 further determines the attention of the driver based on the general gaze direction of other drivers determined from the received data.

The vehicle/notification system 24 receives the signals and selectively controls the vehicle 10 and/or notifies the driver based on the signals. In various embodiments, the vehicle/notification system 24 includes a control module 40, one or more notification devices 42 (e.g., visual, audio, haptic, etc.), and one or more actuators 44 for controlling one or more vehicle components (not shown). The control module 40 receives the signals and controls the notification devices 42 and/or the actuators 44 based thereon.

Figure 2:
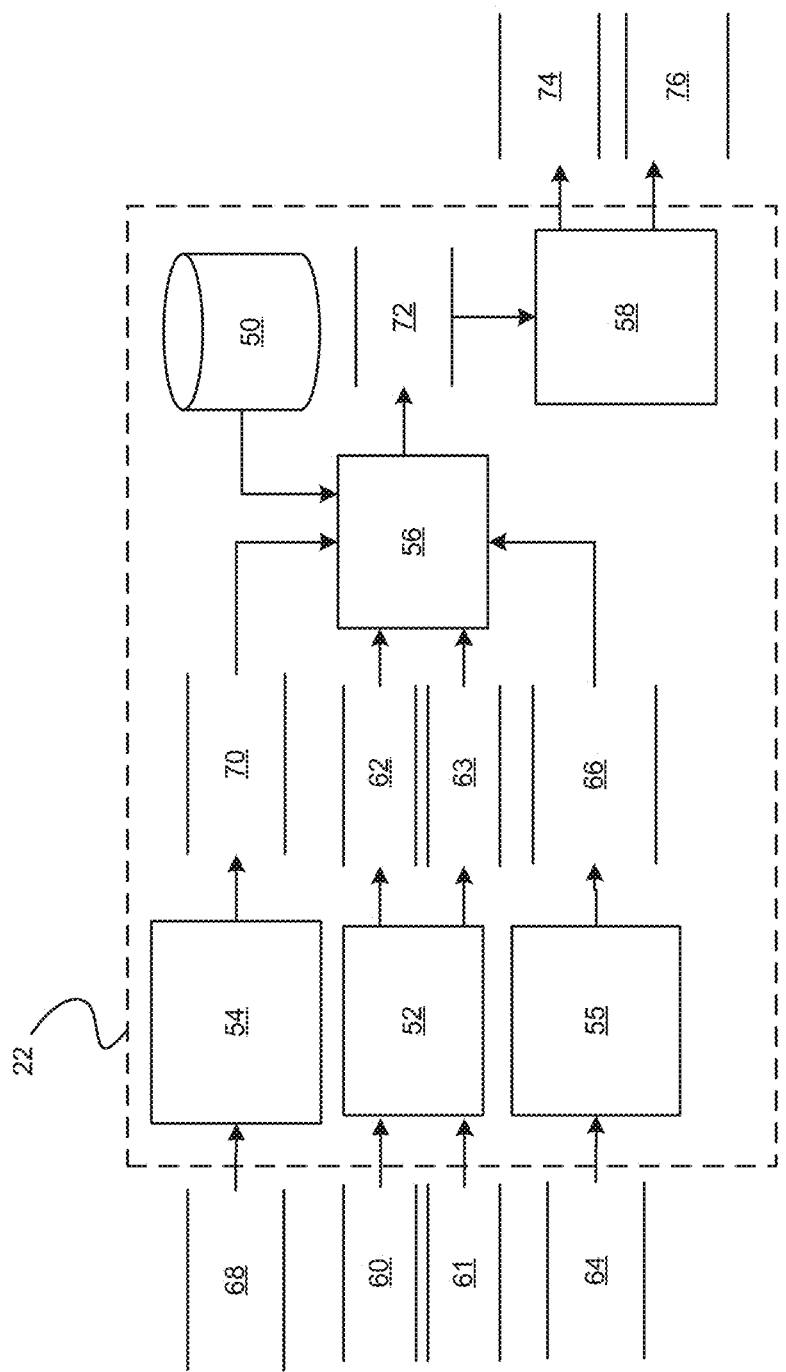
FIG. 2 is a functional block diagram illustrating functional modules of the driver attention detection system in accordance with various embodiments.

Referring now to FIG. 2 and with continued reference to FIG. 1, a dataflow diagram illustrates the attention determination system 22 in more detail in accordance with various embodiments. As can be appreciated, various embodiments of the attention determination system 22 may include any number of sub-modules. The sub-modules shown in FIG. 2 may be combined and/or further partitioned to similarly determine the attention of an occupant of the vehicle 10. Inputs to the attention determination system 22 may be received from the other systems 14-20 of the vehicle 10 and/or determined by other sub-modules (not shown) of the system 22. In various embodiments, the attention determination system 22 includes a vehicle region datastore 50, a gaze location determination module 52, a behavior location determination module 54, an object location determination module 55, an attention scoring module 56, and a vehicle control/notification module 58.

The vehicle region datastore 50 stores data that defines various regions associated with the vehicle 10. For example, as shown in FIG. 3, regions $R_1$-$R_n$ surrounding the vehicle 10 can be defined by an origin O and a reference vector $V_r$ associated with the driver (or other occupant) and/or the vehicle 10 and a first azimuth and a second azimuth relative to the reference vector $V_r$.

As can be appreciated, any number of regions $R_1$-$R_n$ can be defined, the regions can be of varying sizes, and/or any number of the regions can overlap, in various embodiments. In another example, interior regions (not shown) can be defined within the vehicle 10. As can be appreciated, any number of interior regions can be defined, the interior regions can be of varying sizes, and any of the regions can overlap, in various embodiments. In various embodiments, the data stored in the vehicle region datastore 50 can be predefined and/or learned over time.

Figure 3:
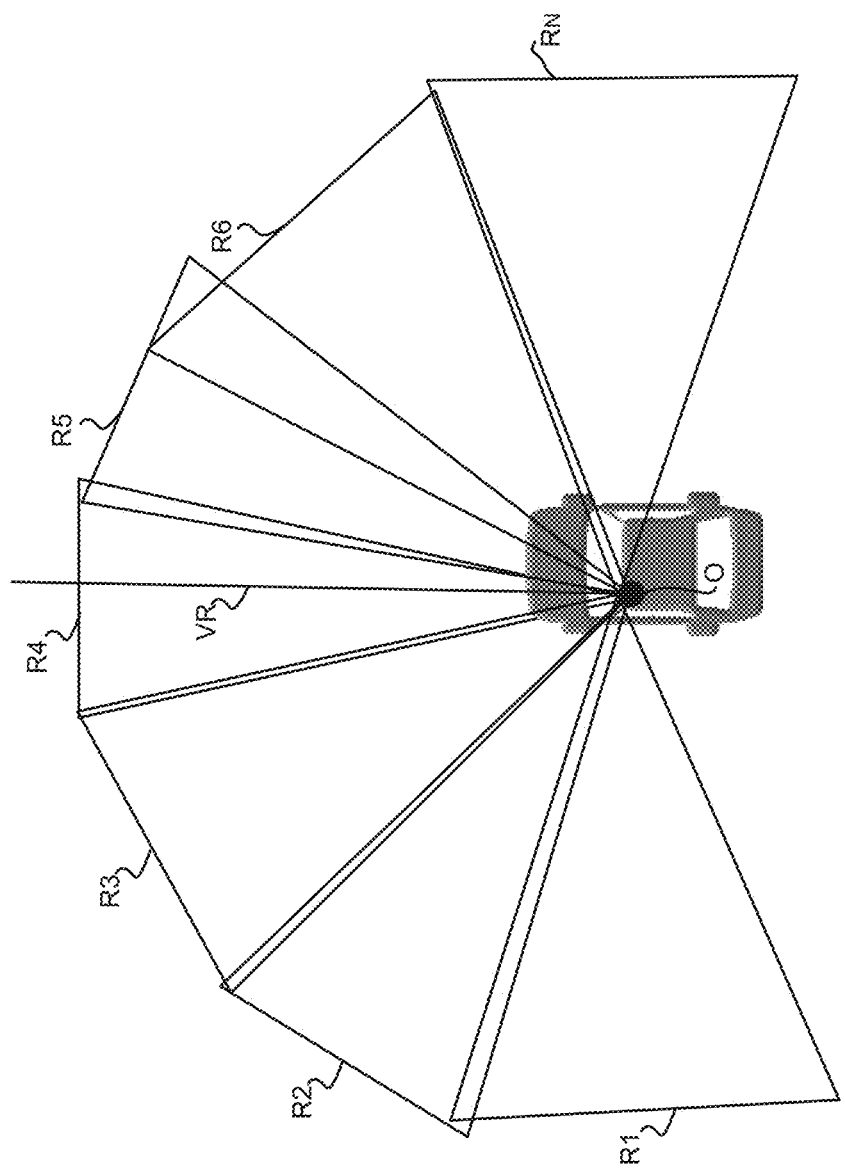
FIG. 3 is an illustration of vehicle regions associated with the vehicle in accordance with various embodiments.

With reference back to FIG. 2 and with continued reference to FIG. 1 and FIG. 3, the vehicle region datastore 50 stores an association of the regions $R_1$-$R_n$ with one or more behaviors. For example, region $R_2$, $R_3$ can be associated with a right turn behavior, regions $R_5$, $R_6$ can be associated with a left turn behavior, regions $R_1$, $R_2$, $R_3$ can be associated with a left lane change behavior, etc.

In various embodiments, the vehicle region datastore 50 stores an association of the regions $R_1$-$R_n$ with one or more distractions. For example, the interior regions (not shown) can be associated with a distraction. In various embodiments, the distraction can be based on an upcoming behavior.

The gaze location determination module 52 receives as input gaze data 60 from the driver monitoring system 14 and gaze data 61 from driver monitoring systems 14 of other vehicles. The gaze location determination module 52 determines an approximate location where the driver is gazing based on the gaze data 60, and determines a general direction where drivers look when at the same location based on the gaze data 61. For example, the gaze location determination module 52 converts, if necessary, the gaze data 60, 61 into the coordinate system used to define the regions $R_1$-$R_n$ (e.g., with the driver/vehicle as the origin and the azimuths from the reference vector). The gaze determination module then sets the converted gaze data 60, 61 to the gaze location 62 and the general gaze location 63 respectively.

The object location determination module 55 receives as input object data 64 for objects detected in the environment from the perception system 16. The object location determination module 55 determines an approximate location of the object based on the object data 64. For example, the object location determination module determines the object azimuth from the object data 64 and maps the location of the object to one or more of the regions $R_1$-$R_n$. The mapped region and/or the object azimuth is then selected as the object location 66.

The behavior location determination module 54 receives as input upcoming behavior data 68 from the behavior planning system 20. The behavior location determination module 54 determines an approximate location 70 where the driver should be looking to prepare for the provided upcoming behavior. For example, in various embodiments, the behavior location determination module 54 determines the location 70 based on characteristics of the upcoming behavior.

Figure 4:
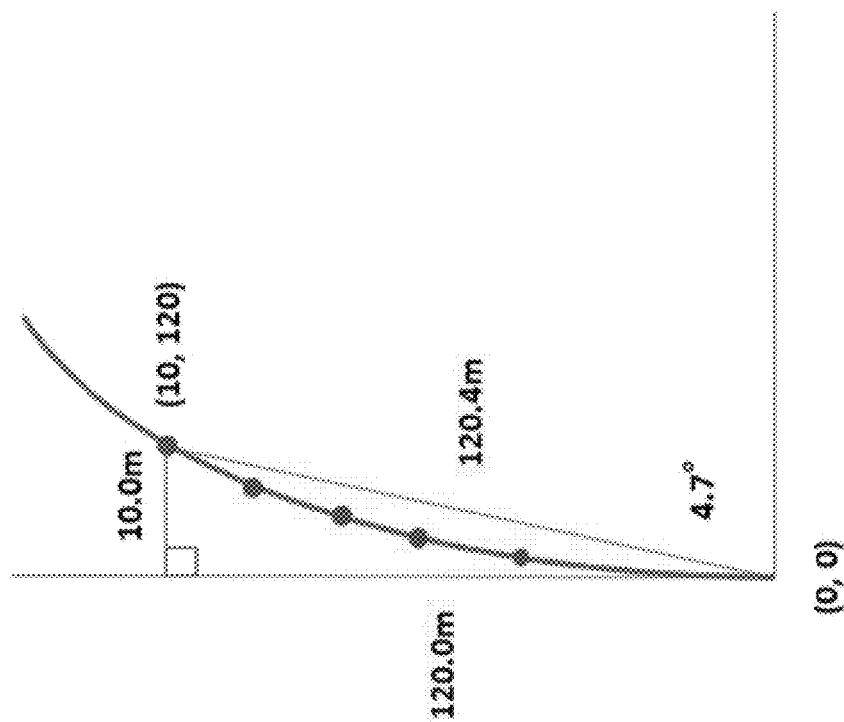
FIG. 4 is an illustration of an upcoming behavior and an associated upcoming behavior location in accordance with various embodiments.

In one embodiment, as shown in FIG. 4, the upcoming behavior includes a forward path including a curve. The curve is provided in a local coordinate frame with the vehicle 10 located at the origin (0,0). The recommended lookahead distance (e.g., 10 seconds) can be determined based on a current vehicle speed and a required bias angle can be determined by locating the recommended lookahead point on the curve (either by choosing the closest communicated point or through linear interpolation).

In the provided example, the recommended lookahead distance is 120.0 meters, and the location (10,120) is selected at the lookahead point. By solving for the triangle, a bias angle of 4.7 degrees can be selected as the upcoming behavior location 70 to ensure the proper lookahead behavior for the upcoming curve. As can be appreciated, the behavior location 70 can be dynamically determined for various upcoming behaviors in various embodiments as the function of the behavior location determination module 54 is not limited to this exemplary embodiment.

With reference back to FIG. 2, in another example, the behavior location determination module 54 selects the upcoming behavior location 70 from the defined regions ($R_1$-$R_n$) that are associated with the upcoming behavior. In other words, instead of dynamically determining the behavior location, the behavior location for a given behavior is selected from predefined locations. In various embodiments, the upcoming behavior can be separated into a latitude behavior and a longitude behavior and different regions may be associated with the different latitude behavior and the longitude behavior. The selected region(s) is then set to the upcoming behavior location 70.

The attention scoring module 56 receives as input the gaze location 62, the general gaze location 63, the object location(s) 66, and the upcoming behavior location(s) 70. The attention scoring module 56 computes an attention score of the driver based on the received data. For example, the attention scoring module computes the attention score by matching the gaze location with the object location(s), matching the gaze location with the upcoming behavior location(s), and matching the gaze location 60 with the general gaze location 63.

For example, in various embodiments, the attention scoring module 56 computes a matching level between the gaze location 62 and the object location 66 based on one or more data correlation methods (e.g., Pearsons, etc.). In various embodiments, the attention scoring module 56 computes an individual matching level for each object found to be within a defined area of the vehicle 10.

The attention scoring module 56 then computes a matching level between the gaze location 62 and the general gaze direction 63 based on one or more data correlation methods (e.g., Pearsons, etc.)

In various embodiments, each of the matching levels can be computed over a defined time period (e.g., over the previous five seconds, or other time value). In various embodiments, each of the matching levels can be computed based on a duration of the matching and/or a breadth of the matching. This is done to ensure that the driver has had time to look at and recognize the scene associated with the region.

The attention scoring module 56 then determines a weighting factor to be applied to the determined matching levels. In various embodiments, the weighting factors are predefined based on a type of the object, a type of the behavior, etc. In various other embodiments, the attention scoring module 56 dynamically determines the weighting factor for each matching level based on environmental conditions (e.g., night time, day time, raining, snowing, etc.), the determined driving scenario (e.g., city driving, rural driving, highway driving, etc.), and/or other factors.

In various embodiments, when the attention scoring module 56 computes individual matching levels for each object found and/or upcoming behaviors (e.g., latitude behavior and longitude behavior), the attention scoring module 56 can further compute a total matching level for all of the objects, and/or a total matching level for the upcoming behaviors based on a summation of the individual matching levels. In such embodiments, the attention scoring module 56 determines a single weighting factor for the total matching levels.

Once the weighting factors are determined, the attention scoring module computes the attention score (AS) 72 based on the following relation:

$$AS = \Sigma_{i=0}^{n} w_i x_i. \qquad (1)$$

Where $x_i$ represents the matching levels (individual or total) for the objects, upcoming behavior, and general gaze direction; and $w_i$ represents the weighting factor.

In various embodiments, the attention scoring module 56 further determines a distraction level of the driver and uses the distraction level in the computation of the attention score 72. For example, the attention scoring module 56 computes the distraction level by matching the gaze location 62 with certain of the regions $R_1$-$R_n$ that are defined as distraction regions. As discussed above, these regions can be areas within the vehicle 10, areas outside of the vehicle 10 and outside of the upcoming path (e.g., to the far left, to the far right, behind the vehicle, etc.). In various embodiments, the distraction level can be computed over a defined time period (e.g., over the previous five seconds, or other time value). In various embodiments, each of the matching levels can be computed based on a duration of the matching and/or a breadth of the matching.

In such embodiments, the attention scoring module 56 then determines a weighting factor to be applied to the distraction level. The weighting factor can similarly be predefined or dynamically determined as discussed above. The attention scoring module 56 then computes the attention score (AS) 72 based on the following relation:

$$AS = \Sigma_{i=0}^{n} w_i x_i - w_j d_j. \qquad (2)$$

Where $x_i$ represents the attention matching levels; $w_i$ and $w_j$ represent the weighting factors; and $d_j$ represents the distraction matching level.

The vehicle control/notification module 58 receives as input the attention score 72. The vehicle control/notification module selectively generates one or more control signals 76 to control the vehicle 10 based on the value of the attention score 72. For example, when the attention score 72 is greater than a threshold value (e.g., 90 or some other value), the vehicle control/notification module 58 generates control signals 76 to control the vehicle 10 in an autonomous or semi-autonomous manner such that any effects of the lack of attention by the driver can be mitigated.

In various embodiments, the vehicle control/notification module 58 selectively generates one or more notification signals 74 based on the value of the attention score 72. For example, when the attention score 72 is greater than a threshold value (e.g., 70 or some other value), the vehicle control/notification module 58 generates a notification signal 74. The notification signal 74 causes one or more notification devices of the vehicle/notification system 24 to notify the driver to pay attention. In various embodiments, the notification signal 74 can enable a text message, a visual sign or light, haptic feedback, and or an audio signal.

Figure 5:
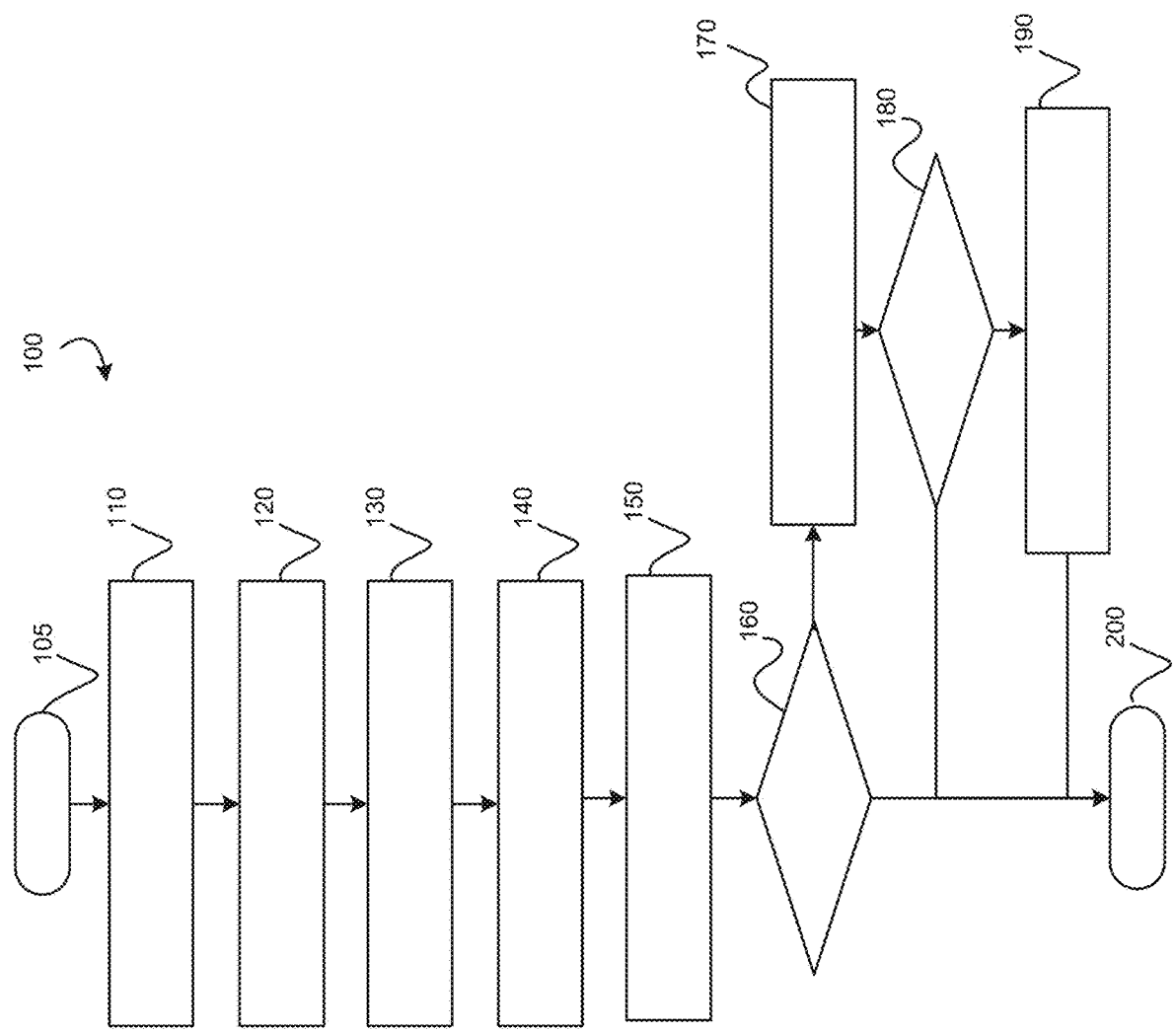
FIG. 5 is a flowchart illustrating a driver attention detection method that may be performed by the driver attention system of FIG. 1 in accordance with various embodiments.

Referring now to FIG. 5, and with continued reference to FIGS. 1-2, a flowchart illustrates driver attention detection methods That may be performed by the sub-modules of the driver attention detection system 12 in accordance with various embodiments. As can be appreciated in light of the disclosure, the order of operation within the method is not limited to the sequential execution as illustrated in FIG. 4, but may be performed in one or more varying orders as applicable and in accordance with the present disclosure. As can further be appreciated, one or more steps of the methods may be added or removed without altering the spirit of the method.

In one example, a method 100 may begin at 105. The gaze data 60, 61, the object data 64, and the upcoming behavior data 68 are received for a time period at 110. The gaze location 62 and general gaze location 63 are determined at 120, for example, as discussed above. The object location(s) 66 is determined at 130, for example, as discussed above. The behavior location(s) 70 is determined at 140, for example, as discussed above. The attention score 72 is then determined at 150 based on computed matching levels between the gaze location 62, the general gaze location 63, the object location(s) 66, and the behavior location(s) 70 and determined weighting factors, for example, as discussed above. Optionally, the attention score 72 is further computed at 150 based on a matching level of distraction, for example, as discussed above.

Thereafter, the computed attention score 72 is evaluated to determine whether to generate notification signals 74 and/or control signals 76 at 160-200. For example, if the attention score is greater than a first threshold at 160, notification signals are generated at 170. If the attention score is greater than a second threshold at 180, control signals are generated at 190. Thereafter, the method may end at 200.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method of processing attention data, comprising:
receiving, by a processor, object data associated with at least one object of an exterior environment of a vehicle;
receiving, by the processor, upcoming behavior data determined from a planned route of the vehicle;
receiving, by the processor, gaze data sensed from an occupant of the vehicle;
processing, by the processor, the object data, the upcoming behavior data, and the gaze data to determine an attention score associated with an attention of the occupant of the vehicle,
wherein the processing comprises:
computing an object location from the object data, computing a gaze location from the gaze data, computing an upcoming behavior location from the upcoming behavior data, and computing the attention score based on the gaze location, the object location, and the upcoming behavior location, and wherein the computing the attention score comprises computing a matching level between the object location and the gaze location;
selectively generating, by the processor, signals to at least one of notify the occupant and control the vehicle based on the attention score.

2. The method of claim 1, wherein the computing the attention score further comprises applying a weighting factor to the matching level.

3. The method of claim 2, wherein the weighting factor is dynamically determined based on environmental conditions.

4. The method of claim 2, wherein the weighting factor is dynamically determined based on a driving scenario.

5. The method of claim 1, wherein the computing the matching level is based on a duration of matching.

6. The method of claim 1, wherein the computing the matching level is based on a breadth of matching.

7. The method of claim 1, further comprising determining a distraction level based on a matching between the gaze location and a distraction region, and wherein the attention score is further determined based on the distraction level.

8. The method of claim 7, further comprising applying a weighting factor to the distraction level and wherein the attention score is further based on the weighted distraction level.

9. The method of claim 8, wherein the weighting factor is dynamically determined based on environmental conditions.

10. The method of claim 8, wherein the weighting factor is dynamically determined based on a driving scenario.

11. The method of claim 1, further comprising receiving gaze data from occupants of other vehicles at a same location; determining a general gaze direction based on the gaze data from the occupants of other vehicles; and wherein the processing the object data, the upcoming behavior data, and the gaze data to determine the attention score further comprises processing the object data, the upcoming behavior data, the gaze data from the occupant, and the general gaze direction to determine the attention score associated with an attention of the occupant of the vehicle.

12. A method of processing attention data, comprising:
receiving, by a processor, object data associated with at least one object of an exterior environment of a vehicle;
receiving, by the processor, upcoming behavior data determined from a planned route of the vehicle;
receiving, by the processor, gaze data sensed from an occupant of the vehicle;
processing, by the processor, the object data, the upcoming behavior data, and the gaze data to determine an attention score associated with an attention of the occupant of the vehicle,
wherein the processing comprises:
computing an object location from the object data, computing a gaze location from the gaze data, computing an upcoming behavior location from the upcoming behavior data, and computing the attention score based on the gaze location, the object location, and the upcoming behavior location;
selectively generating, by the processor, signals to at least one of notify the occupant and control the vehicle based on the attention score, wherein the computing the attention score comprises computing a matching level between the upcoming behavior location and the gaze location.

13. The method of claim 12, wherein the computing the attention score further comprises applying a weighting factor to the matching level.

14. The method of claim 12, wherein the computing the matching level is based on a duration of matching.

15. The method of claim 12, wherein the computing the matching level is based on a breadth of matching.

16. A system for processing attention data, comprising:
at least one sensor device that senses an exterior environment of a vehicle and provides sensor data; and
a non-transitory computer module that, by a processor,
processes the sensor data for object data associated with at least one object of an exterior environment of a vehicle and to determine an object location;
processes upcoming behavior data determined from a planned route of the vehicle to determine an upcoming behavior location;
processes gaze data sensed from an occupant of the vehicle to determine a gaze location;
processes the object location, the upcoming behavior location, and the gaze location to determine an attention score associated with an attention of the occupant of the vehicle, wherein the attention score is computed based on a matching level between the object location and the gaze location and a matching level between the upcoming behavior location and the gaze location; and
generates signals to at least one of notify the occupant and control the vehicle based on the attention score.

17. The system of claim 16, wherein the non-transitory computer module computes the attention score based on a weighting factor applied to the matching level between the object location and the gaze location and a weighting factor applied to the matching level between the upcoming behavior location and the gaze location.

* * * * *